June 9, 1931.  C. W. CARMAN  1,809,436
PROCESS OF PURIFYING METALS
Filed Feb. 26, 1927
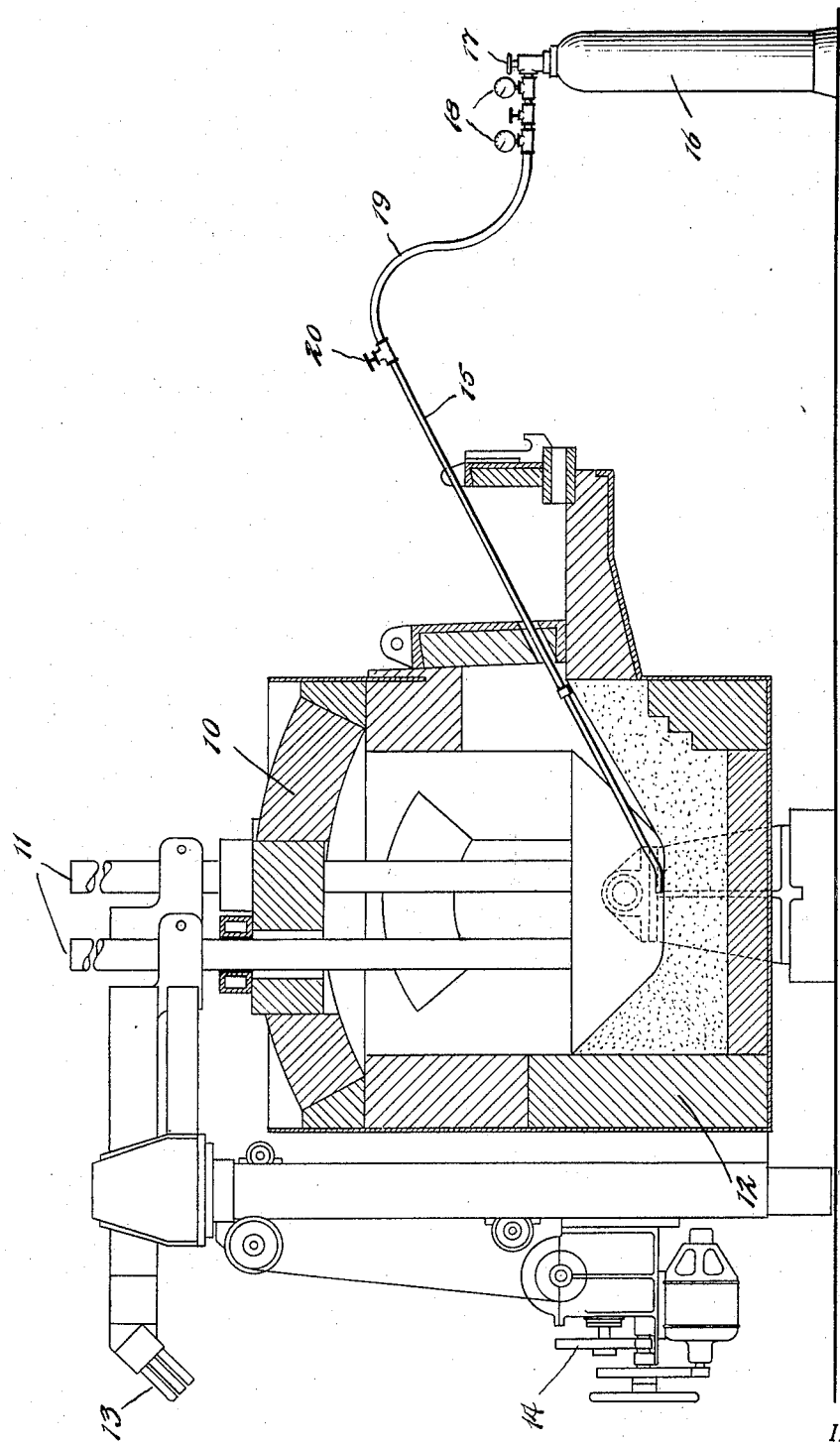
INVENTOR.
CHARLES W. CARMAN
BY
ATTORNEY Patented June 9, 1931

1,809,436

UNITED STATES PATENT OFFICE

CHARLES W. CARMAN, OF WASHINGTON, PENNSYLVANIA, ASSIGNOR, BY MESNE ASSIGNMENTS, TO STAINLESS STEEL CORPORATION, OF YOUNGSTOWN, OHIO, A CORPORATION OF DELAWARE

PROCESS OF PURIFYING METALS

Application filed February 26, 1927. Serial No. 171,318.

This invention relates to the process of producing metals or alloys thereof in purified homogeneous structure free from blow holes and the like. The object is to produce alloys of improved and homogeneous quality at low cost. Specifically an object is the production of a non-corrosive or stainless steel at low cost.

It has been appreciated that blow holes and imperfections in steel, in castings and ingots are caused by gaseous impurities. A variety of expedients have been tried for the purpose of purging the molten bath of these impurities, but they have generally been open to the objection of being too expensive except for the high priced steels. It is commonly assumed that oxygen is one of the most objectionable gases and a number of reducing agents such as silicon, titanium etc. have been used to extract the oxygen from the bath.

According to this invention a molten metal in an electric furnace for example is oxidized to produce a substantial ebullition and give off impurities, after which it is further purified by material like palladium. Specifically scrap is melted until the carbon content is of the amount desired, when gaseous oxygen is supplied near the bottom of the furnace, chemically and mechanically causing an ebullition, after which palladium and alloying metals are introduced. It has been discovered that when this process is applied to a low carbon steel alloyed with a small amount of copper and nickel, a rustless or stainless steel of superior quality is produced at low enough cost to far undersell the ordinary stainless steels.

Referring to the drawing, the single figure illustrates an electric furnace provided with an oxygen supply pipe for carrying out this process.

The electric furnace 10 may be any commercial make of furnace having either single or polyphase electrodes 11 provided with the usual terminals 13 leading to customary transformers not shown. The lining 12 may be either acid or basic, preferably the latter as such is more common practice. The usual mechanism 14 for controlling the position of the electrodes is provided as is customary with such furnaces. Through a side wall of the furnace is drilled a hole to receive the pipe 15 which is made of some material having a high melting point such, for example, as a chrome nickel base alloy. This pipe is adjustable so that it may extend to adjacent the bottom of the furnace and then be withdrawn from the contents of the furnace when not in use. For supplying the pipe 15 a standard oxygen bottle 16 is located at any place convenient to the furnace. The bottle is provided with the usual reducing valve 17 and one or more gauges 18 to indicate the pressure of gas being supplied to the pipe 15. A flexible hose 19 connects the bottle and pipe, and a valve 20 is provided in the outer end of the pipe 15. Generally the pipe 15 is entirely withdrawn from the furnace and the hole plugged with some refractory material, but if the end of the pipe is left within the furnace wall and only withdrawn from the molten metal it is best to close the valve 20 and so prevent the hose 19 being filled with any furnace gases. If desired the valve 20 may serve as a reducing valve doing away with the necessity of a reducing valve 17 on the bottle.

In operation the furnace is charged with scrap iron and the current applied to the electrodes for melting down the entire charge. For purposes of illustration the invention is described in connection with the process of manufacture of a low carbon stainless or non-corrosive steel. When melted the charge will have a temperature of about 3100° F., and be in condition for purifying. The first step in purification under this invention frequently follows some customary preliminary purification such as by slagging off and consists in the introduction of the pipe 15 to adjacent the bottom of the molten bath and the introduction of oxygen to the bath under pressure sufficient to overcome the head of molten metal. The oxygen oxidizes the impurities causing an ebullition to occur which is probably due to both the mechanical agitation of the bath by the oxygen and also the oxidation of some of the impurities. In practice about 38 to 45 cubic feet of oxygen per ton of metal in the furnace has been found sufficient and the oxygen is injected at about a pressure of 35 or 40 pounds, although of course the pressure will depend upon the depth of molten metal in the furnace. One injection of the oxygen, gases will be seen to rise which are first of a bluish color and then become of a yellow hue. The exact constituency of these gases is not known. Following injection of the oxygen, the pipe 15 is withdrawn and the current cut off from the electrodes 11. Material containing palladium is then thrown into the furnace to further purify the bath. It is found that the best results are obtainable if the palladium is introduced in such manner that it will float for a short time on the bath. To accomplish this result 1 part of an oxide of palladium is alloyed with about 2 parts of metallic aluminum which has a specific gravity less than that of the bath. About one pound of this aluminum alloy for each gross ton of steel is introduced in preferably powdered or granulated form. The current having been shut off from the electrodes, there is no danger of an accidental short circuit being caused by the material thrown in to the furnace. The alloying materials are next thrown into the bath in the desired proportions and preferably a few minutes later so as to give the palladium time to perform its work. In the present process for making stainless low carbon steels some quantities of copper and nickel are added to enhance the non-corrosive character of the metal. A typical analysis of the stainless low carbon steel made by this process is as follows:

|            | Per cent   |
|---|---|
| Carbon     | .08 to .15 |
| Manganese  | .40        |
| Phosphorus | .05        |
| Sulphur    | .004       |
| Silicon    | .003       |
| Copper     | .02        |
| Nickel     | .01        |
| Palladium  | .001       |
| Aluminum   | Trace      |

After the alloying materials have been added current is again applied to the furnace and its temperature raised sufficiently for pouring into molds. Preferably the molds are removed after pouring and the material reheated to about 1650° F. for rolling or blooming into a variety of forms such as structural shapes, plates, bars and the like.

While this process of obtaining a homogeneous steel free from blow holes and the like has been described in connection with the making of a low carbon steel, it is nevertheless capable of use to obtain a high carbon steel and a variety of alloys.

Among the advantages of this invention may be included the removal of gaseous impurities in a different manner from that of previous attempts to obtain a homogenous steel. Gaseous oxygen possesses a number of advantages over the use of air. Pure oxygen is not only quicker and more effective in purifying the bath but none of the objectionable nitrogen compounds are formed as is the case when air is substituted. Also the bath is not cooled to such an extent as would be the case if air were used. Oxygen is one of the cheapest gases available for thus effectively removing impurities without partaking of the disadvantages of air. The palladium being added in such minute quantities does not raise the cost an undue amount. When the bath has been supplied with a little copper and nickel to give a composition such as that indicated, it has been found that this homogeneous low carbon steel is of such superior non-corrosive and stainless character as to compete with the high chrome steels which necessarily require a high carbon content for alloying. The effective removal of gaseous impurities not only produces a homogenous product free from blow holes but also produces a product in which cooling strains do not result in the customary piping and shrinkage imperfections whereby there is less waste than when a substantial portion of a casting must be dicarded. On injection of the oxygen it is thought that impurities are oxidized and driven off, the temperature of the bath being raised by the oxidation. The aluminum and palladium alloy is preferably introduced into the furnace in small pieces about the size of shot. The aluminum almost entirely fuses off leaving only a trace in the bath. If desired, any floating impurities may be skimmed off as is customary preferably soon after melting down and after the addition of suitable flux but before injection of oxygen. The scrap metal initially supplied is preferably of a low carbon content.

What I claim is:

1. The process of purifying molten steel in a closed container which comprises adding material containing palladium oxide and aluminum in sufficient quantity to float the palladium oxide.

2. The process of purifying molten metal which comprises adding an alloy of palladium and aluminum.

3. The process of purifying molten metal which comprises adding an oxide of palladium alloyed with aluminum.

4. The process of purifying molten steel which comprises oxidizing and agitating the same by the injection of gaseous oxygen below the surface thereof, and then adding a material containing palladium which floats on the molten metal.

5. The process of treating molten iron which comprises oxidizing off impurities and adding less than 1% of a floatable mixture of palladium oxide and aluminum.

6. The process of treating molten iron which comprises oxidizing off impurities, adding a floatable mixture of palladium oxide and aluminum, and adding less than 1% of copper and nickel.

7. The process of treating molten metal which comprises injecting gaseous oxygen and adding metallic aluminum with an oxide of a member of the platinum group.

8. The process of treating molten metal which comprises injecting gaseous oxygen, adding a floatable material comprising aluminum and an oxide of a member of the platinum group, and adding a small amount of alloying material adapted to enhance the stainless character of the metal when cool.

9. The process of treating molten metal which comprises injecting gaseous oxygen and adding a floatable material containing palladium and aluminum.

10. The process of treating molten metal which comprises injecting gaseous oxygen and adding a floatable material containing aluminum and a member of the platinum group.

In testimony whereof I have hereunto set my hand this 19th day of February, 1927.

CHARLES W. CARMAN.